(12) United States Patent
Askan

(10) Patent No.: US 11,120,955 B2
(45) Date of Patent: Sep. 14, 2021

(54) LOW-VOLTAGE CIRCUIT BREAKER DEVICE WITH MULTIPLE-BREAKING SWITCH

(71) Applicant: Eaton Intelligent Power Limited, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 154 days.

(21) Appl. No.: 16/349,289

(22) PCT Filed: Nov. 13, 2017

(86) PCT No.: PCT/EP2017/079080
§ 371 (c)(1),
(2) Date: May 13, 2019

(87) PCT Pub. No.: WO2018/091418
PCT Pub. Date: May 24, 2018

(65) Prior Publication Data
US 2020/0194195 A1    Jun. 18, 2020

(30) Foreign Application Priority Data
Nov. 15, 2016  (DE) .................... 10 2016 121 835.9

(51) Int. Cl.
*H01H 9/54* (2006.01)
*H02H 3/02* (2006.01)

(52) U.S. Cl.
CPC ............ *H01H 9/542* (2013.01); *H01H 9/548* (2013.01)

(58) Field of Classification Search
CPC ............... G01R 31/085; G01R 31/327; G01R 31/3275; H01H 2009/543;
(Continued)

(56) References Cited

U.S. PATENT DOCUMENTS 4,883,931 A    11/1989  Batteux et al.
6,208,126 B1 *  3/2001  Gonthier ............... H03K 17/687
                                                              323/239
(Continued)

FOREIGN PATENT DOCUMENTS

EP    2866242 A1    4/2015
JP    11234894 A    8/1999
(Continued)

OTHER PUBLICATIONS

ECEE—University of Colorado Boulder [online], /ecee.colorado.edu/ [retrieved on Sep. 16, 2003], Retrieved from the Internet: <URL: https://ecee.colorado.edu/~ecen5797/course_material/Ch4slides.pdf> (Year: 2003).*

*Primary Examiner* — Jared Fureman
*Assistant Examiner* — Nicolas Bellido
(74) *Attorney, Agent, or Firm* — Leydig, Voit & Mayer, Ltd.

(57) ABSTRACT

A low-voltage circuit breaker device includes: at least one external conductor section from an external conductor supply connection of the low-voltage circuit breaker device to an external conductor load connection of the low-voltage circuit breaker device; a mechanical bypass switch arranged in the external conductor section; a first semiconductor circuit arrangement connected in parallel to the mechanical bypass switch; an electronic control unit; a current measuring arrangement arranged in the external conductor section, which current measuring arrangement is connected to the electronic control unit, the electronic control unit controlling the mechanical bypass switch and the first semiconductor circuit arrangement when a given overcurrent, namely a short-circuit current, is detected by the current measuring arrangement; and a second semiconductor circuit arrangement arranged in the external conductor section in series
(Continued)

with the mechanical bypass switch and in parallel to the first semiconductor circuit arrangement.

11 Claims, 1 Drawing Sheet

(58) Field of Classification Search
CPC ............. H01H 2009/544; H01H 33/38; H01H 33/596; H01H 33/72; H01H 47/002; H01H 71/123; H01H 83/20; H01H 9/40; H01H 9/42; H01H 9/541; H01H 9/542; H01H 9/548; H02H 1/06; H02H 3/021; H02H 3/025; H02H 3/05; H02H 3/06; H02H 3/08; H02H 3/087; H02H 3/10; H02H 3/105; H02H 3/24; H02H 9/045
See application file for complete search history.

(56) References Cited

U.S. PATENT DOCUMENTS

| | | | |
|---|---|---|---|
| 10,116,132 B2 * | 10/2018 | Lee ...................... | H01H 33/596 |
| 2011/0102052 A1 * | 5/2011 | Billingsley ............ | H01H 9/542 |
| | | | 327/365 |
| 2012/0299393 A1 * | 11/2012 | Hafner .................. | H01H 9/548 |
| | | | 307/113 |
| 2015/0002977 A1 | 1/2015 | Dupraz et al. | |
| 2015/0280421 A1 * | 10/2015 | Niwa ....................... | H02H 5/10 |
| | | | 361/91.1 |
| 2016/0203932 A1 * | 7/2016 | Niehoff .................. | H01H 47/32 |
| | | | 361/170 |
| 2016/0301200 A1 * | 10/2016 | Niehoff ..................... | H02H 3/08 |
| 2016/0301204 A1 * | 10/2016 | Niehoff ..................... | H02H 1/06 |
| 2016/0314928 A1 * | 10/2016 | Niehoff ..................... | H01H 83/04 |
| 2017/0163023 A1 * | 6/2017 | Niehoff ................. | H02H 3/027 |
| 2017/0236676 A1 * | 8/2017 | Bartonek .......... | H02J 13/00036 |
| | | | 361/115 |
| 2019/0206638 A1 * | 7/2019 | Askan .................... | H01H 9/542 |
| 2019/0206639 A1 * | 7/2019 | Askan ...................... | H01C 7/12 |
| 2019/0206640 A1 * | 7/2019 | Askan ..................... | H02H 3/08 |
| 2019/0229525 A1 * | 7/2019 | Askan .................... | H01H 9/542 |
| 2019/0229529 A1 * | 7/2019 | Askan .................... | H01H 9/542 |
| 2019/0252143 A1 * | 8/2019 | Askan .................... | H01H 47/32 |
| 2019/0279829 A1 * | 9/2019 | Askan .................... | H02H 7/222 |
| 2019/0341764 A1 * | 11/2019 | Askan ................... | H02H 1/0007 |
| 2019/0341769 A1 * | 11/2019 | Askan ................... | H02H 1/0007 |
| 2020/0058454 A1 * | 2/2020 | Askan .................... | H01H 9/542 |

FOREIGN PATENT DOCUMENTS

| | | |
|---|---|---|
| WO | WO 2011057675 A1 | 5/2011 |
| WO | WO 2015028634 A1 | 3/2015 |

* cited by examiner

LOW-VOLTAGE CIRCUIT BREAKER DEVICE WITH MULTIPLE-BREAKING SWITCH

CROSS-REFERENCE TO PRIOR APPLICATIONS

This application is a U.S. National Phase application under 35 U.S.C. § 371 of International Application No. PCT/EP2017/079080, filed on Nov. 13, 2017, and claims benefit to German Patent Application No. DE 10 2016 121 835.9, filed on Nov. 15, 2016. The International Application was published in German on May 24, 2018 as WO 2018/091418 under PCT Article 21(2).

FIELD

The invention relates to a low-voltage circuit breaker device.

BACKGROUND

A corresponding circuit breaker device from WO 2015/028634 A1 of the applicant is known. Such breaker devices work according to zero voltage switching. The bypass switch is only opened when the circuit breaker device is switched off, resulting in an arc, and the current is commutated onto the semiconductor circuit arrangement.

This has the drawback that a load is always applied to the contacts of the bypass switch, which is worn out with each switching operation. Furthermore, the semiconductor circuit arrangement is heavily stressed, as the current at the transition from the bypass switch to the semiconductor circuit arrangement is already very high in the case of an increasing short-circuit current, and the semiconductor circuit arrangement is suddenly loaded with this high current. As a result, critical components of the circuit breaker device are subjected to very high loads each time it is switched off, especially when switching a short-circuit current for safety reasons, which reduces the service life of the circuit breaker device.

A concept of a hybrid protection device from WO 2011/057675 A1, which has a high-speed bypass switch, to which a semiconductor switch is arranged in series, is known from the field of energy distribution and energy transport in the high-voltage and medium-voltage range.

US 2015/0002977 A1 discloses a high-voltage protection system.

U.S. Pat. No. 4,883,931 and EP 2 866 242 A1 only present different designs of mechanical switches with double breaking.

SUMMARY

In an embodiment, the present invention provides a low-voltage circuit breaker device, comprising: at least one external conductor section from an external conductor supply connection of the low-voltage circuit breaker device to an external conductor load connection of the low-voltage circuit breaker device; a mechanical bypass switch being in the external conductor section; a first semiconductor circuit arrangement connected in parallel to the mechanical bypass switch; an electronic control unit; a current measuring arrangement arranged in the external conductor section, which current measuring arrangement is connected to the electronic control unit, the electronic control unit being configured to control the mechanical bypass switch and the first semiconductor circuit arrangement when a given overcurrent comprising a short-circuit current is detected by the current measuring arrangement; and a second semiconductor circuit arrangement arranged in the external conductor section in series with the mechanical bypass switch and in parallel to the first semiconductor circuit arrangement, wherein the mechanical bypass switch comprises a multiple-breaking switch, wherein the second semiconductor circuit arrangement comprises low-voltage MOSFETs, and wherein the low-voltage circuit breaker device has a neutral conductor section from a neutral conductor connection of the low-voltage circuit breaker device to a neutral conductor load connection of the low-voltage circuit breaker device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
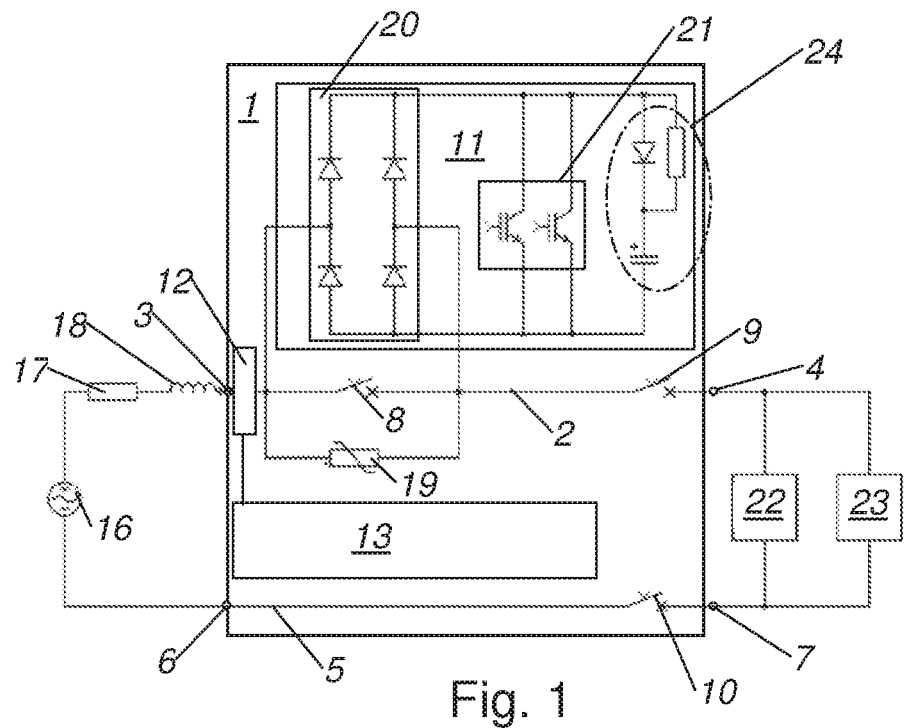
FIG. 1 shows a circuit breaker device of the prior art.

In an embodiment, the present invention provides a circuit breaker device of the type mentioned at the beginning with which the aforementioned drawbacks can be avoided, which has a small size and which has a high reliability over a long period.

This allows a circuit breaker device to be designed which has a small size and a high reliability over a long period.

The multiple breaking of the bypass switch allows a contact distance needed for the switching off of a short circuit to be reached more quickly. The multiple breaking of the bypass switch creates multiple arcs with multiple arc voltages, reducing commutation time. The multiple breaking can reduce the volume and mass of the bypass switch. This can reduce inertia and contact opening time. By reducing the contact opening time, the required safe contact distance can be reached more quickly to allow a short-circuit current to be switched off by the power semiconductor of the first semiconductor circuit arrangement. This can reduce the load on the first semiconductor circuit arrangement, which is subjected to a very high load during the time it takes for the bypass switch to reach the safe contact distance needed to prevent re-ignition of the arc at the contacts of the bypass switch. Furthermore, with the contacts of the bypass switch reaching this safe distance more quickly, less loadable power semiconductors can be used in the first semiconductor circuit arrangement. Such power semiconductors have a lower internal resistance as well as a smaller physical size than the more loadable power semiconductors. Due to the smaller size, in particular the shorter distances within the power semiconductors, the loop inductor of the circuit breaker device can be reduced, whereby the commutation time of the short-circuit current on the first semiconductor circuit arrangement can also be directly reduced. The commutation time is further reduced by the lower internal resistance.

However, real embodiments of the bypass switch with multiple breaking have shown that the contacts never open exactly at the same time. With a very finely defined observation time, it could be determined that one of the contact pairs of movable and fixed contact normally causes the opening or separation process before the at least one further contact pair. This means that, during this period, the entire short-circuit current that builds up or increases must be carried by only one contact pair, which is however not designed for this purpose. This not only leads to a high load on this contact, but also to a deterioration or extension of the commutation time and consequently to an increase in the load on the power semiconductors of the first semiconductor circuit arrangement.

Since the second semiconductor circuit arrangement already commutates the current to the first semiconductor circuit arrangement without contact movement of the bypass switch, the contacts of the bypass switch can be designed weaker and with smaller masses, whereby they have lower inertia and can be opened faster. The contacts can thus also be optimised more regarding their resistance, and can be less thermally loadable.

The second semiconductor circuit arrangement can reduce the load on both the bypass switch and the semiconductor arrangement. This means that the current can be commutated onto the semiconductor circuit arrangement even at significantly lower current levels than with conventional circuit breaker devices, thus reducing the load on the semiconductor circuit arrangement and extending its service life. This means that the differences in the opening times of the bypass switch contacts are no longer a problem. This substantially eliminates the occurrence of an arc at the bypass switch, reducing the load on the corresponding switching contacts and extending their service life. This allows the advantages of multiple breaking at the bypass switch to be exploited without being negatively affected by its features.

Figure 2:
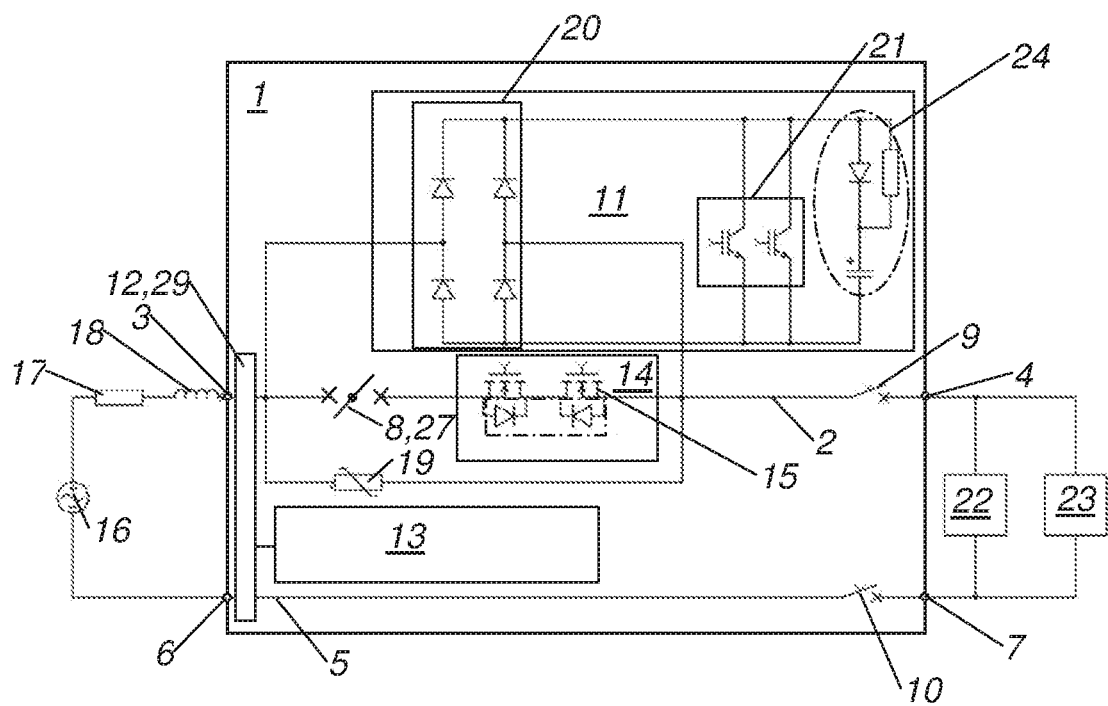
FIG. 2 shows a low-voltage circuit breaker device according to the preferred embodiment of the invention in question.

FIG. 2 shows a low-voltage circuit breaker device 1 with an external conductor section 2 from an external conductor supply connection 3 of the low-voltage circuit breaker device 1 to an external conductor load connection 4 of the low-voltage circuit breaker device 1, and a neutral conductor section 5 from a neutral conductor connection 6 of the low-voltage circuit breaker device 1 to a neutral conductor load connection 7 of the low-voltage circuit breaker device 1, a mechanical bypass switch 8 and a first mechanical disconnector 9 being arranged in series in the external conductor section 2, a second mechanical disconnector 10 being arranged in the neutral conductor section 5, a first semiconductor circuit arrangement 11 of the low-voltage circuit breaker device 1 being connected in parallel to the bypass switch 8, a current measuring arrangement 12 being arranged in the external conductor section 2, which current measuring arrangement 12 is connected with an electronic control unit 13 of the low-voltage circuit breaker device 1, with the electronic control unit 13 being designed in such a way that it controls the bypass switch 8, the first mechanical disconnector 9, the second mechanical disconnector 10 and the first semiconductor circuit arrangement 11 when a predeterminable overcurrent, in particular a short-circuit current, is detected by the current measuring arrangement 12, with the bypass switch 8 being designed in such a way that it is a multiple-breaking switch and a second semiconductor circuit arrangement 14 is arranged in the external conductor section 2 in series with the bypass switch 8 and parallel to the first semiconductor circuit arrangement 11 in terms of circuitry.

This allows a low-voltage circuit breaker device 1 to be designed which has a small size and a high reliability over a long period.

The multiple breaking of the bypass switch 8 allows a contact distance needed for the switching off of a short circuit to be reached more quickly. The multiple breaking can reduce the volume and mass of the bypass switch 8. This can reduce inertia of the moving parts and contact opening time. By reducing the contact opening time, the needed safe contact distance can be reached more quickly to allow a short-circuit current to be switched off by the power semiconductor 21 of the first semiconductor circuit arrangement 11. This can reduce the load on the first semiconductor circuit arrangement 11, which is subjected to a very high load during the time it takes for the bypass switch 8 to reach the safe contact distance needed to prevent re-ignition of the arc at the contacts of the bypass switch 8. With the contacts of the bypass switch 8 reaching this safe distance more quickly, less loadable power semiconductors 20, 21 can be used in the first semiconductor circuit arrangement 11. Such power semiconductors 20, 21 have a lower internal resistance as well as a smaller physical size than the more loadable power semiconductors 20, 21. Due to the smaller size, in particular the shorter distances within the power semiconductors 21, the relevant loop inductor of the low-voltage circuit breaker device 1 can be reduced, whereby the commutation time of the short-circuit current on the first semiconductor circuit arrangement 11 can also be directly reduced. The commutation time is further reduced by the lower internal resistance.

However, real embodiments of the bypass switch 8 with multiple breaking have shown that the contacts never open exactly at the same time. With a very finely defined observation time, it could be determined that one of the contact pairs of movable and preferably fixed contact normally causes the opening or separation process before at least one further contact pair. This means that, during this period, the entire short-circuit current that builds up or increases must be carried by only one contact pair, which is however not designed for this purpose. This not only leads to a high load on this contact pair, but also to a deterioration or extension of the commutation time and consequently to an increase in the load on the power semiconductors 20, 21 of the first semiconductor circuit arrangement 11.

The second semiconductor circuit arrangement 14 can reduce the load on both the bypass switch 8 and the first semiconductor arrangement 11. This means that the current can be commutated onto the first semiconductor circuit arrangement 11 even at significantly lower current levels than with conventional circuit breaker devices according to FIG. 1, which can reduce the load on the first semiconductor circuit arrangement 11 and extend its service life. This means that the differences in the opening times of the bypass switch 8 contacts are not a problem. This substantially eliminates the occurrence of an arc at the bypass switch 8, which can reduce the load on the corresponding switching contacts and extend their service life. This allows the advantages of multiple breaking at the bypass switch 8 to be exploited without being negatively affected by its features.

Further advantages can be achieved through these measures. Since no arc appears when switching off, no arc has to be extinguished. No hot ionised gases are produced, which would first have to be cooled in order to prevent a re-ignition of an electric arc. This can both reduce the load capacity of the first semiconductor circuit arrangement 11 and further accelerate the entire switch-off process, since there is no longer any need to fear a re-ignition of an arc. Alternatively, the load capacity of the first semiconductor circuit arrangement 11 can remain unchanged and the opening speed of the bypass switch 8 can be reduced, making it easier to design.

By quickly switching off a short-circuit or overload current, less energy is stored than usual in the form of leakage inductance or in the mains inductance, which protects the surge arrester 19 and the snubber 24. This can also be designed smaller due to further effects.

Since there is no switching arc, the voltage drop at the first semiconductor circuit arrangement 11 is not limited by the arc voltage.

This circuit breaker device 1 and the circuit breaker device according to WO 2015/028634 A1 are low-voltage circuit breaker devices. As usual, low voltage means the range up to 1000V alternating voltage or 1500V direct voltage.

FIG. 1 shows a circuit breaker device according to the prior art as described in WO 2015/028634 A1, for example. Like the circuit breaker device 1 according to FIG. 2, this has an external conductor section 2 as well as a neutral conductor section 5. The external conductor section 2 runs through the circuit breaker device 1 from an external conductor supply connection 3 to an external conductor load connection 4. The neutral conductor section 5 runs through the circuit breaker device 1 from a neutral conductor connection 6 to a neutral conductor load connection 7. The connections in question 3, 4, 6, 7 are preferably designed as screw connection terminals or plug-in terminals and are arranged in the circuit breaker device 1 so that they are accessible from the outside.

The circuit breaker device 1 preferably has an insulated housing.

A conventional mechanical bypass switch 8 with simple contact breaking is arranged in the external conductor section 2. Preferably and as shown, a first mechanical disconnector 9 is also arranged in the external conductor section 2, in particular in series with the bypass switch 8. A second mechanical disconnector 10 is preferably arranged in the neutral conductor section 5. A semiconductor circuit arrangement 11 is connected in parallel to the bypass switch 8.

Furthermore, a surge arrester 19 is connected in parallel to the bypass switch 8.

The circuit breaker device 1 also has a current measuring arrangement 12, which is arranged in the external conductor section 2, and which is preferably designed with a shunt resistor.

The current measuring arrangement 12 is connected to an electronic control unit 13 of the circuit breaker device 1, which electronic control unit 13 is preferably designed to comprise a microcontroller or microprocessor. The electronic control unit 13 is designed to control the bypass switch 8 and the first semiconductor circuit arrangement 11, as well as preferably the first mechanical disconnector 9 and the second mechanical disconnector 10 so that these can be actuated or switched in a pre-settable manner. For this purpose, the electronic control unit 13 is preferably connected to the first semiconductor circuit arrangement 11 as well as to, in particular, electromagnetic actuating elements of the mechanical switches and therefore of the bypass switch 8 of the first mechanical disconnector 9 and the second mechanical disconnector 10 in terms of circuitry. The corresponding connections starting from the electronic control unit 13 are not shown in FIGS. 1 and 2.

The first semiconductor circuit arrangement 11 preferably has a rectifier circuit 20, which is preferably designed as a full bridge, as well as, in the case of this embodiment, two power semiconductors 21, which are designed as IGBT, as actual switching or control elements. A larger power semiconductor 21 can also be provided.

In FIGS. 1 and 2, the electrical environment is indicated in addition to the actual circuit breaker device 1. The supply network is represented by the AC/DC mains voltage source 16, the internal mains resistance 17 and the mains inductance 18. Furthermore, an electrical load 23 and an electrical fault 22 are shown in the form of a short circuit.

In a breaker device according to the prior art, as shown in FIG. 1, it is provided that a switch-off process is carried out by the bypass switch 8 and the first semiconductor circuit arrangement 11, and the first and second disconnectors 9, 10 serve only to ensure galvanic disconnection of the load circuit after the switch-off.

In the case of this low-voltage circuit breaker device 1, as shown as the preferred embodiment in FIG. 2, it is provided that the bypass switch 8 is designed as a multiple-breaking switch 27. The reference symbol 27 indicates the multiple-breaking switch, which fulfils the function of the bypass switch 8. Furthermore, a second semiconductor circuit arrangement 14 is arranged in the external conductor section 2 in series with the bypass switch 8 and parallel to the first semiconductor circuit arrangement 11. The surge arrester 19 is also connected in parallel to the bypass switch 8 and the second semiconductor circuit arrangement 14. The second semiconductor circuit arrangement 14 is also controlled by the electronic control unit 13.

This low-voltage circuit breaker device 1, as shown as the preferred embodiment in FIG. 2, is preferably constructed like the low-voltage circuit breaker device 1 according to FIG. 1, except for the difference described.

The multiple-breaking switch 27 has at least one double breaking, it being preferably provided that the multiple-breaking switch 27 is designed with at least one moveable switching bridge with at least one first and at least one second movable contact. The switch 27 is shown as a diagram in FIG. 2. It may also be provided that the multiple-breaking switch 27 also has triple breaking, quadruple breaking or fivefold breaking. Multiple-breaking switches 27 and movable switching bridges are known in principle, which is why they will not be discussed in more detail here.

The electronic control unit 13 is intended or designed to control the bypass switch 8, the first mechanical disconnector 9, the second mechanical disconnector 10, the first semiconductor circuit arrangement 11 and the second semiconductor circuit arrangement 14 when a predeterminable overcurrent, in particular a short-circuit current, is detected by the current measuring arrangement 12, in order to cause the circuit breaker device 1 to switch off. It is preferably provided here that the electronic control unit 13 is designed in such a way that, when a short-circuit current is detected by the current measuring arrangement 12, it firstly blocks the second semiconductor circuit arrangement 14, then opens the bypass switch 8, then changes the first semiconductor circuit arrangement 11 over to the non-conductive state, and subsequently opens the first mechanical disconnector 9 and second mechanical disconnector 10, the first mechanical disconnector 9 opening first when it is switched off, followed by the second mechanical disconnector 10. By operating in this order, it is possible that the current can already commutate to the first semiconductor circuit arrangement 11 when it is still very small, with no corresponding drop with a connecting arc being required at the bypass switch 8. The multiple contacts of the bypass switch 8 therefore already open in the currentless state, which is why no arcing and no problems due to the different contact opening occur.

After switching off the IGBTs 21, the voltage will increase due to the energy stored in the network. The rising voltage is conducted by the surge arrester 19, which limits the current. If the current is low enough, the first and second mechanical disconnectors 9, 10 are opened.

Preferably, the second semiconductor circuit arrangement 14 is designed to be bidirectional. The second semiconductor circuit arrangement 14 is especially preferred as a four-quadrant switch, for both current directions and both voltage polarities.

Furthermore, it is preferably provided that the second semiconductor circuit arrangement 14 is designed comprising low-voltage MOSFETs 15. The second semiconductor circuit arrangement 14 is constantly in current flow, so its internal resistance is relevant if excessive power loss is to be avoided at this point. After switching off the second semiconductor circuit arrangement 14, the current commutates to the first semiconductor circuit arrangement 11. The voltage drop across the second semiconductor circuit arrangement 14 amounts to only a few volts. When switching off the first semiconductor circuit arrangement 11, it must be ensured that the switching contacts of the bypass switch 8, 27 have already reached a sufficient contact distance to ensure that no voltage is applied to the second semiconductor circuit arrangement 14.

The low-voltage MOSFET 15 is preferred as 20-30V MOSFET due to its very low internal resistance and to keep the power loss low in regular operation. The voltage drop at the low-voltage MOSFET 15 only serves to bring the current to commutate to the first semiconductor circuit arrangement 11.

Due to the intrinsic body diode of the MOSFET, only two such low-voltage MOSFETs 15 are required for a bidirectional switch. Due to the high conductivity, high currents can be achieved at low gate voltages.

The first semiconductor circuit arrangement 11 is designed to be resilient in order to switch high currents and voltage peaks in the event of a short circuit. The first semiconductor circuit arrangement 11 can be switched off as soon as the contacts of the bypass switch 8, 27 have sufficient contact distance.

The MOSFETs 15 each have an antiparallel diode 28, also known as a monolithic body diode. The respective diodes are shown in FIG. 2 in a dot-dashed box.

When switching on a switched-off low-voltage circuit breaker device 1, it may be the case that this has previously been switched off due to a short-circuit switch-off so that the contacts of the bypass switch 8 are open. The relevant electrical fault may still be present. When the switching contacts of the bypass switch 8 are closed, the contacts may bounce. A conductive connection is established for a short time and then interrupted again until a mechanically stable state is reached. This leads to a high load on the contacts, especially in the event of a short circuit. Furthermore, there is a risk of damage to the second semiconductor circuit arrangement 14, in particular when switching on the low-voltage circuit breaker device 1 in the event of a short circuit.

It is therefore preferably provided that the electronic control unit 13 is designed in such a way that, when switching on the switched-off low-voltage circuit breaker device 1 with an open bypass switch 8 and blocked first and second semiconductor circuit arrangements 11, 14, the second mechanical disconnector 10 is closed first followed by the first mechanical disconnector 9, the first semiconductor circuit arrangement 11 is switched on after at least one predeterminable first period, the bypass switch 8 is closed substantially immediately thereafter, the second semiconductor circuit arrangement 14 is switched on after a predeterminable second period and the first semiconductor circuit arrangement 11 is switched off substantially immediately thereafter.

The first period is long enough for the switching contacts of the first mechanical disconnector 9 and the switching contacts of the second mechanical disconnector 10 to reach a mechanically stationary state. When switching on a direct current, it is sufficient to wait for this time.

To switch on an alternating current, it is preferably provided that the electronic control unit 13 is designed to switch on the second semiconductor circuit arrangement 14 at the next zero crossing of the applied voltage at the end of the first period. To detect the zero crossing of the applied voltage, the low-voltage circuit breaker device 1 has a voltage measurement arrangement 29 which is connected to the control unit 13.

The second period is long enough for the switching contacts of the bypass switch 8 to reach a mechanically stationary state.

The measures above allow the low-voltage circuit breaker device 1 to be switched on without subjecting the individual components to excessive loads.

A further advantage of these measures is that, in the event of a switching process when there is a defect in the first semiconductor circuit arrangement 11, the low-voltage circuit device 1 does not burn. With a low-voltage circuit breaker device 1 according to FIG. 1, the bypass switch 8 would open in this case and thus the resulting arc would lead to a burning of the bypass switch 8 and consequently of the entire low-voltage circuit breaker device 1. This is not the case with the low-voltage circuit breaker device 1 according to FIG. 2. Due to an avalanche or avalanche breakdown of the MOSFET 15, the bypass switch 8, 27 continues to open without an arc so that burning can be avoided. Since this can lead to destruction of the second semiconductor circuit arrangement 14, the second semiconductor circuit arrangement 14 is preferably encapsulated in protective housing, in particular metal housing, within the low-voltage circuit breaker device 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A low-voltage circuit breaker device, comprising:
at least one external conductor section from an external conductor supply connection of the low-voltage circuit breaker device to an external conductor load connection of the low-voltage circuit breaker device;
a mechanical bypass switch arranged in the external conductor section;
a first semiconductor circuit arrangement connected in parallel to the mechanical bypass switch;
an electronic control unit;
a current measuring arrangement arranged in the external conductor section, which current measuring arrangement is connected to the electronic control unit, the electronic control unit being configured to control the mechanical bypass switch and the first semiconductor circuit arrangement when a given overcurrent comprising a short-circuit current is detected by the current measuring arrangement; and
a second semiconductor circuit arrangement arranged in the external conductor section in series with the mechanical bypass switch and in parallel to the first semiconductor circuit arrangement,
wherein the mechanical bypass switch comprises a multiple-breaking switch, and wherein the multiple-breaking switch comprises at least one first movable contact and at least one second movable contact;
wherein the second semiconductor circuit arrangement comprises low-voltage MOSFETs, and
wherein the low-voltage circuit breaker device has a neutral conductor section from a neutral conductor connection of the low-voltage circuit breaker device to a neutral conductor load connection of the low-voltage circuit breaker device.

2. The low-voltage circuit breaker device according to claim 1, wherein the second semiconductor circuit arrangement is configured bidirectionally as a bidirectional four-quadrant switch.

3. The low-voltage circuit breaker device according to claim 1, wherein the low-voltage MOSFETs comprise 20-30V MOSFETs.

4. The low-voltage circuit breaker device according to claim 1, wherein the multiple-breaking switch comprises at least one moveable switching bridge.

5. The low-voltage circuit breaker device according to claim 1, wherein a first mechanical disconnector is arranged in the external conductor section in series with the mechanical bypass switch, and
wherein the electronic control unit is configured to actuate the first mechanical disconnector.

6. The low-voltage circuit breaker device according to claim 1, wherein a second mechanical disconnector is arranged in the neutral conductor section, and
wherein the electronic control unit is configured to actuate the second mechanical disconnector.

7. The low-voltage circuit breaker device according to claim 5, wherein the electronic control unit is configured such that when a short-circuit and/or overcurrent is detected by the current measuring arrangement, it firstly opens the second semiconductor circuit arrangement, then opens the mechanical bypass switch, then changes the first semiconductor circuit arrangement over to a non-conductive state, and subsequently opens the first mechanical disconnector and the second mechanical disconnector.

8. The low-voltage circuit breaker device according to claim 5, wherein the electronic control unit is configured such that when switching on the switched-off low-voltage circuit breaker device with an open mechanical bypass switch and opened first and second semiconductor circuit arrangements, the second mechanical disconnector is closed first followed by the first mechanical disconnector, the first semiconductor circuit arrangement is switched on after at least one predeterminable first period, the mechanical bypass switch is closed substantially immediately thereafter, the second semiconductor circuit arrangement is switched on after a predeterminable second period, and the first semiconductor circuit arrangement is switched off substantially immediately thereafter.

9. The low-voltage circuit breaker device according to claim 8, wherein the first period is long enough for switching contacts of the first mechanical disconnector and switching contacts of the second mechanical disconnector to reach a mechanically stationary state.

10. The low-voltage circuit breaker device according to claim 9, wherein when an alternating current is switched on, the electronic control unit is configured to switch on the second semiconductor circuit arrangement at a next zero crossing of an applied voltage at an end of the first period.

11. The low-voltage circuit breaker device according to claim 8, wherein the second period is long enough for switching contacts of the mechanical bypass switch to reach a mechanically stationary state.

* * * * *